(12) United States Patent
Ha

(10) Patent No.: US 9,776,513 B2
(45) Date of Patent: Oct. 3, 2017

(54) INPUT DEVICE USING A PLURALITY OF MAGNETS, AND STEERING WHEEL AND VEHICLE HAVING THE SAME

(71) Applicant: Hyundai Motor Company, Seoul (KR)

(72) Inventor: DongHyun Ha, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/941,796

(22) Filed: Nov. 16, 2015

(65) Prior Publication Data

US 2016/0347178 A1 Dec. 1, 2016

(30) Foreign Application Priority Data

Jun. 1, 2015 (KR) .......................... 10-2015-0077253

(51) Int. Cl.
*B60K 37/06* (2006.01)
*B62D 1/04* (2006.01)
(Continued)

(52) U.S. Cl.
CPC .............. *B60K 37/06* (2013.01); *B62D 1/046* (2013.01); *G06F 3/0482* (2013.01);
(Continued)

(58) Field of Classification Search
None
See application file for complete search history.

(56) References Cited

U.S. PATENT DOCUMENTS

| 2002/0003527 A1* | 1/2002 | Baker | ................... E02F 9/2004 345/156 |
| 2004/0021638 A1* | 2/2004 | Kaizaki | ................. G06F 3/0213 345/167 |

(Continued)

FOREIGN PATENT DOCUMENTS

| JP | H10116148 A | 5/1998 |
| JP | 2004-139578 A | 5/2004 |

(Continued)

OTHER PUBLICATIONS

Korean Notice of Allowance for Korean Application No. 10-2015-0077253, dated Feb. 1, 2017, English summary, 6 pages.

*Primary Examiner* — David D Davis
(74) *Attorney, Agent, or Firm* — Mintz Levin Cohn Ferris Glovsky and Popeo, P.C.; Peter F. Corless

(57) ABSTRACT

A vehicle includes: an input device, and a controller configured to receive a signal from the input device and generate a predetermined control signal corresponding to the received signal. The input device includes: a rotation member provided with a first magnet disposed on a portion thereof; a fixation member provided with a plurality of second magnets disposed on a surface thereof; and a detection member generating a signal including information related to a relative position of the rotation member against the fixation member based on a variation of a magnetic field intensity. The second magnets have a different magnetic field intensity from each other according to a distribution position of the second magnets. The variation of magnetic field intensity is generated between the first magnet and the second magnets due to a position change of the first magnet when the rotation member is rotated.

20 Claims, 10 Drawing Sheets

(51) Int. Cl.
  *H01F 7/02* (2006.01)
  *G06F 3/0484* (2013.01)
  *G06F 3/0482* (2013.01)

(52) U.S. Cl.
  CPC ....... *G06F 3/04842* (2013.01); *H01F 7/0294* (2013.01); *B60K 2350/928* (2013.01)

(56) References Cited

U.S. PATENT DOCUMENTS

| | | | | |
|---|---|---|---|---|
| 2004/0056842 | A1* | 3/2004 | Iisaka | G06F 3/03549 345/167 |
| 2004/0164963 | A1* | 8/2004 | Ono | G06F 3/03549 345/167 |
| 2007/0100523 | A1* | 5/2007 | Trachte | B60K 35/00 701/41 |
| 2010/0231212 | A1* | 9/2010 | Yamamoto | G01D 5/145 324/247 |
| 2011/0134041 | A1* | 6/2011 | Yamamoto | G06F 3/03549 345/167 |
| 2014/0292692 | A1* | 10/2014 | Okuyama | B62D 1/046 345/173 |

FOREIGN PATENT DOCUMENTS

| | | |
|---|---|---|
| JP | 2008-257630 A | 10/2008 |
| JP | 2011-145724 A | 7/2011 |
| JP | 2013-206304 A | 10/2013 |
| KR | 10-2009-0041321 A | 4/2009 |
| KR | 10-0947729 B1 | 3/2010 |

\* cited by examiner (A) ROTATION (B) CLICKING (A)

(B)

INPUT DEVICE USING A PLURALITY OF MAGNETS, AND STEERING WHEEL AND VEHICLE HAVING THE SAME

CROSS-REFERENCE TO RELATED APPLICATION

This application claims the benefit of and priority to Korean Patent Application No. 10-2015-0077253, filed on Jun. 1, 2015 in the Korean Intellectual Property Office, the entire disclosure of which is incorporated herein by reference.

BACKGROUND

1. Technical Field

Embodiments of the present disclosure relate generally to a vehicle and, more particularly, to a user interface of a vehicle.

2. Description of Related Art

Over recent years, apparatuses for improving the convenience, safety, and comfort of drivers in vehicles have increased. Therefore, the types of user interfaces for operating a vehicle also have increased.

For instance, a user interface such as a button, a lever, and a dial, may be used in a conventional vehicle. There are various types of buttons, including a lamp button, broadcast signal selection button, and a window open/close button. Types of levers include a selection lever for a direction indication and a wiper operation lever. Types of dials may include a dial for setting temperature for air conditioner and an audio volume control dial.

However, such user interfaces may have operational difficulties. For instance, menu selection is limited. As the menu options are increased, the number of buttons/levers/dials must be increased, as well. Problematically, increasing the number of buttons/levers/dials may not be possible due to size restrictions.

In other words, extension of menu functionality may be unfeasible. That is, when a single menu is allocated using a single button/lever/dial, it may be almost impossible to additionally allocate another menu using the same button/lever/dial. As a result, when increasing the number of buttons/levers/dials, the additional buttons/levers/dials may need to be distributed over a wide area. This may cause the reduction of the concentration in the user interface and additional distractions for the driver.

SUMMARY

Therefore, it is an aspect of the present disclosure to provide an input device as an improved user interface capable of providing wider extension and greater concentration of input devices, and capable of improving driving convenience of a user. Additional aspects of the present disclosure will be set forth in part in the description which follows and, in part, will be apparent from the description, or may be learned by practice of the disclosed embodiments.

In accordance with embodiments of the present disclosure, a vehicle includes: an input device, and a controller configured to receive a signal from the input device and generate a predetermined control signal corresponding to the received signal. The input device includes: a rotation member provided with a first magnet disposed on a portion thereof; a fixation member provided with a plurality of second magnets disposed on a surface thereof; and a detection member generating a signal including information related to a relative position of the rotation member against the fixation member based on a variation of a magnetic field intensity. The second magnets have a different magnetic field intensity from each other according to a distribution position of the second magnets. The variation of magnetic field intensity is generated between the first magnet and the second magnets due to a position change of the first magnet when the rotation member is rotated.

The plurality of second magnets may be radially disposed on the surface of the fixation member.

Among the plurality of second magnets, the magnetic field intensity of a magnet disposed in a center of the plurality of second magnets may be stronger than the magnetic field intensity of a magnet disposed apart from the center.

The rotation member may be a ball having a spherical shape.

A portion of the rotation member may protrude to limit a rotation range of the rotation member, and the first magnet may be disposed on the protrusion part of the rotation member.

The first magnet and the plurality of second magnets may have an opposite polarity to each other.

The vehicle may further include: a first housing in which a portion of the rotation member is placed and the fixation member is fixedly installed; a switch configured to generate a second signal indicating an on-state or an off-state by being turned on/off as a result of compression of the rotation member and release of the compression of the rotation member; and a second housing accommodating the first housing and provided with the switch. The switch is installed in a position where a compression force of the rotation member is delivered to the switch through the first housing.

The first housing and the second housing may have a cylindrical shape.

A bearing may be provided between the first housing and the second housing to allow the first housing to be smoothly moved in the second housing.

A shock absorption member may be provided between the rotation member and the first housing to absorb an impact generated when the rotation member collides with the first housing.

An elastic member may be provided between the first housing and the second housing.

Furthermore, in accordance with embodiments of the present disclosure, an input device includes: a rotation member provided with a first magnet disposed on a portion thereof; a fixation member provided with a plurality of second magnets disposed on a surface thereof; and a detection member generating a signal including information related to a relative position of the rotation member against the fixation member based on a variation of a magnetic field intensity. The second magnets have a different magnetic field intensity from each other according to a distribution position of the second magnets. The variation of magnetic field intensity is generated between the first magnet and the second magnets due to a position change of the first magnet when the rotation member is rotated.

The plurality of second magnets may be radially disposed on the surface of the fixation member.

Among the plurality of second magnets, the magnetic field intensity of a magnet disposed in a center of the plurality of second magnets is stronger than the magnetic field intensity of a magnet disposed apart from the center.

The rotation member may be a ball having a spherical shape.

A portion of the rotation member may protrude to limit a rotation range of the rotation member, and the first magnet may be disposed on the protrusion part of the rotation member.

The first magnet and the plurality of second magnets may have an opposite polarity to each other.

Furthermore, in accordance with embodiments of the present disclosure, a vehicle includes: an input device provided on a steering wheel system of the vehicle, and a controller configured to receive a signal from the input device and generate a predetermined control signal corresponding to the received signal. The input device includes: a rotation member provided with a first magnet disposed on a portion thereof; a fixation member provided with a plurality of second magnets disposed on a surface thereof; and a detection member generating a signal including information related to a relative position of the rotation member against the fixation member based on a variation of a magnetic field intensity. The second magnets have a different magnetic field intensity from each other according to a distribution position of the second magnets. The variation of magnetic field intensity is generated between the first magnet and the second magnets due to a position change of the first magnet when the rotation member is rotated.

The steering wheel system may include a rim, a spoke, and a hub. The input device may be installed in the hub. Alternatively, the input device may be installed in the rim.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION OF THE EMBODIMENTS

Figure 1:
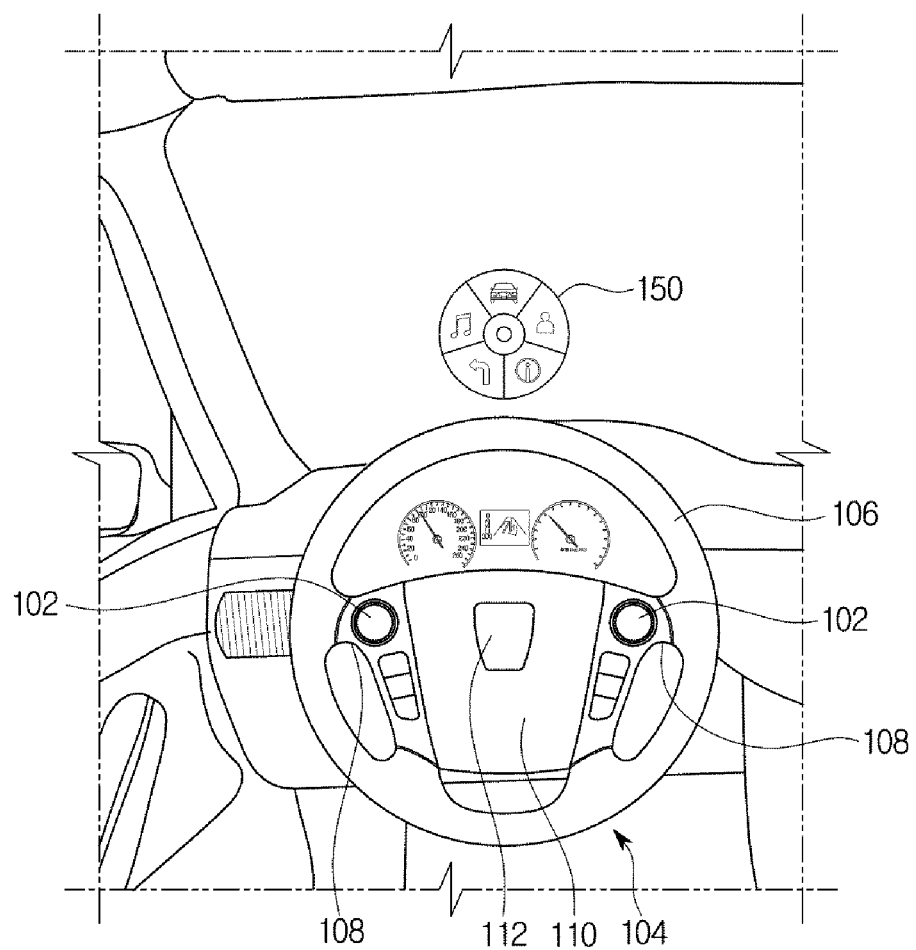
FIG. 1 is a view illustrating a steering wheel, which is a steering wheel system provided with an input device in accordance with a first embodiment of the present disclosure.

Hereinafter, embodiments of the present disclosure will be described in detail with reference to the accompanying drawings. As those skilled in the art would realize, the described embodiments may be modified in various different ways, all without departing from the spirit or scope of the present disclosure. Thus, the embodiments described herein are not intended to limit the scope of the present disclosure. Further, throughout the specification, like reference numerals refer to like elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Reference will now be made in detail to embodiments of the present disclosure, examples of which are illustrated in the accompanying drawings.

FIG. 1 is a view illustrating a steering wheel, which is a steering wheel system provided with an input device in accordance with a first embodiment of the present disclosure. An input device 102 in accordance with a first embodiment of the present disclosure may be installed in a steering wheel 104 configured to steer a vehicle.

The steering wheel 104 may include a rim 106, a spoke 108 and a hub 110. An alarm button 112 may be installed in the center of the hub 110. In the hub 110, a pair of input devices 102 in accordance with a first embodiment may be installed in the right and left side of the alarm button 112.

The installation position of the input device 102 may be set in consideration of a driver's holding position of the steering wheel 104. In a general driving type, in which driving at a high speed is rare, a driver's holding position in the steering wheel may be placed at from 3 o'clock direction and 9 o'clock direction. Therefore, as illustrated in FIG. 1, the input device 102 may be installed in a position where both thumbs of a driver are touched when the driver holds between 3 o'clock direction and 9 o'clock direction of the steering wheel 104, so that the user may easily operate the input device 102 while driving.

The input device 102 in accordance with a first embodiment may be configured to allow a driver to easily and conveniently operate various devices needed for driving. For example, as illustrated in FIG. 1, a graphical user interface 150 in a head up display (HUD) type may be exposed in a wind shield of the front of the vehicle, and menu on the exposed graphical user interface 150 may be selected. For this, through a rotation (scroll) of the input device 102, the movement between menus or the change of set value may be realized, and the selected content may be confirmed by clicking of the input device 102.

Figure 2:
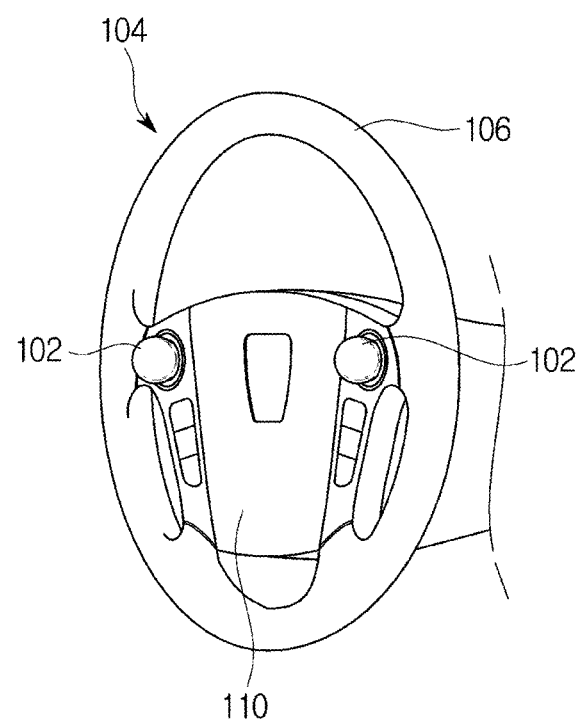
FIG. 2 is a view illustrating a steering wheel, in which an input device in accordance with a first embodiment, as illustrated in FIG. 1 is installed, when viewing from another angle.

FIG. 2 is a view illustrating a steering wheel, in which an input device in accordance with a first embodiment, as illustrated in FIG. 1 is installed, when viewing from another angle. As illustrated in FIG. 2, the input device 102 in accordance with a first embodiment may be formed in a ball shape having a spherical shape (refer to 302 in FIG. 3), and installed in a way that a part of the ball is protruded from a surface of the steering wheel 104. The driver may generate a needed input signal, which is a signal inputted from the input device 102 to a controller of the vehicle, by operating the protrusion part of the ball 302 of FIG. 3 in various manner, such as rotation, click, and press.

Figure 3:
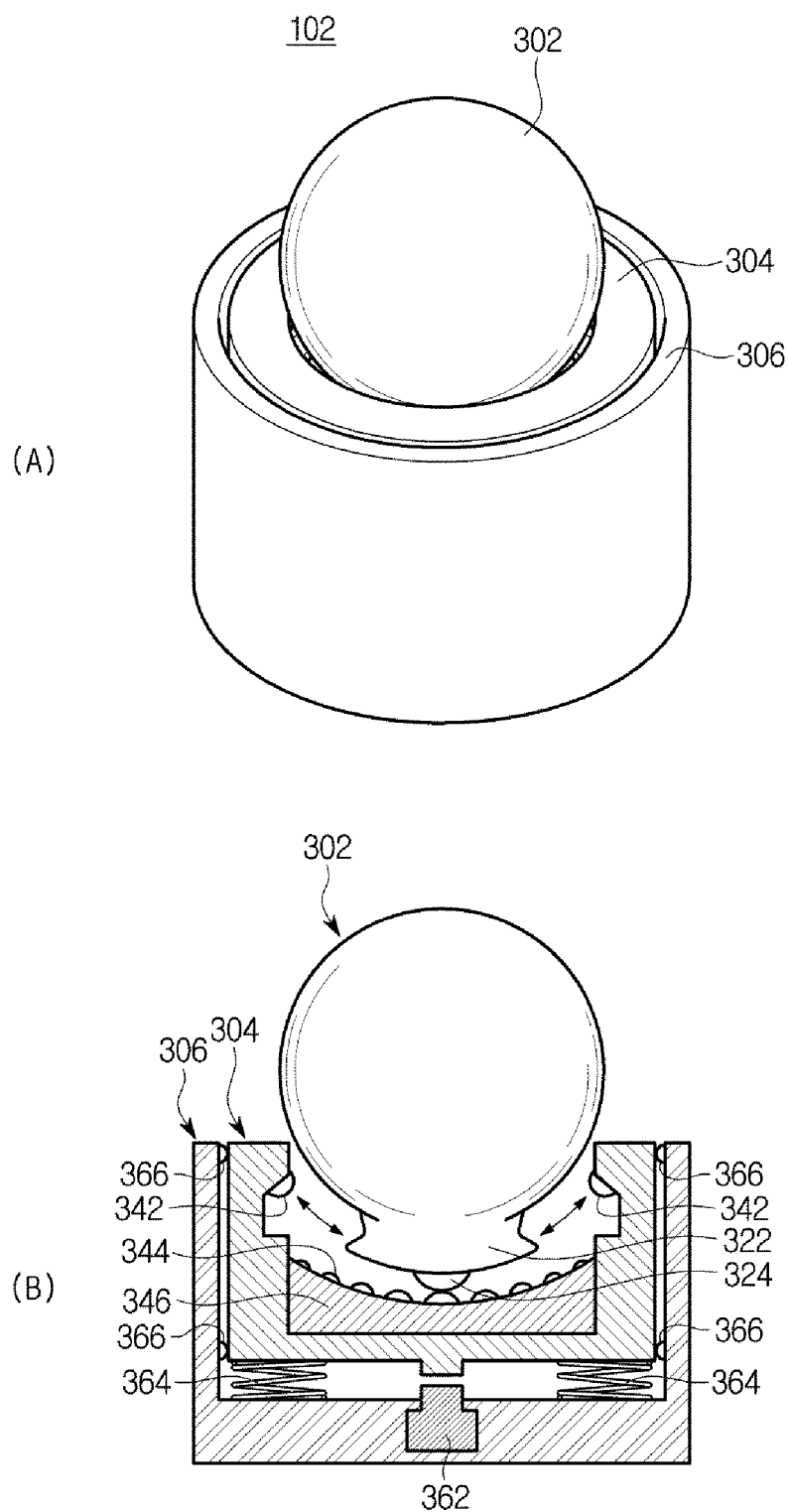
FIG. 3 is a view illustrating a structure of an input device in accordance with a first embodiment illustrated in FIG. 1.

FIG. 3 is a view illustrating a structure of an input device in accordance with a first embodiment illustrated in FIG. 1.

FIG. 3(A) is a perspective view of the input device 102. As illustrated in FIG. 3(A), the input device 102 in accordance with a first embodiment may include a ball 302, an internal housing 304, an external housing 306, a switch 362, and an elastic member. A part of the ball 302 may be exposed out of the internal housing 304, and a driver may rotate/click/press the exposed part. The internal housing 304 and the external housing 306 may be formed in a cylindrical shape. Regardless of the shape of the ball 302, the internal housing 304 and the external housing may have a polygonal cylindrical shape as well as a cylindrical shape.

FIG. 3(B) is a lateral cross-sectional view of the input device 102. The ball 302 may basically have a spherical shape, and may further include a locking protrusion 322 formed in a protrusion manner. A part of the ball 302 may be placed in the internal housing 302, and the rest of the ball 302 may be exposed to the outside. A part where the locking protrusion 322 of the ball 302 is formed may be placed in the internal housing 304. The locking protrusion 322 may be integrally formed with the ball 302 as a single molding. Alternatively, a sphere part and the locking protrusion 322 may be manufactured separately and then may be coupled to each other in a mechanical manner, such as assembly and adhesion.

The locking protrusion 322 may be configured to limit the rotation angle of the ball 302 so that the ball 302 is prevented from being rotated over a certain angle when the ball is rotated inside the internal housing 304. The shape and the size of the locking protrusion 322 may be formed to limit the rotation range of the ball 302. Accordingly, in a state in which the ball 302 is placed and rotated in the internal housing 304, when the rotation of the ball 302 reaches a certain rotation angle, the locking protrusion 322 may make contact with an inner surface of the internal housing 304 and further rotation of the ball 302 may be prevented so that the rotation angle of the ball 302 may be limited.

A magnet 324 may be provided on a surface of the locking protrusion 322 facing the internal housing 304. The magnet 324 may have a circular shape and may be protruded slightly from the surface of the locking protrusion 322. Alternatively, the magnet 324 may formed in various polygonal shapes besides a circular shape. The magnet 324 of the ball 302 may have a polarity, which is opposite to a magnet 344 of the internal housing 304 described later, that is the magnet 324 and the magnet 344 are incompatible. Since the magnet 324 of the ball 302 and the magnet 344 of the internal housing 304 may have a different polarity from each other, strong gravitation may be applied between two magnets 324 and 344 so that the ball 302 may keep in a stable state, without escaping from the internal housing 304. The magnet 324 of the ball 302 may be defined as a first magnet and the magnet 344 of the internal housing 304 may be defined as a second magnet. The magnet 324 may be permanent magnet. The magnet 324 may be magnetic monopole.

The internal housing 304 may have a cylindrical shape. A part of the ball 302, which is a part of a side where the locking protrusion 322 is formed, may be placed in an upper portion of the internal housing 304. In an inner side of an upper edge of the internal housing 304, a shock absorption member 342 may be provided. When the ball 302 is rotated, the locking protrusion 322 may collide with the inner side of an upper edge of the internal housing 304 and a noise may be generated. Therefore, the shock absorption member 342 may absorb an impact, the generation of the noise may be restrained, and the damage in the ball 302 and the internal housing 304 may be prevented. The shock absorption member 342 may be an O-ring made of rubber. Alternatively, the shock absorption member 342 may be an O-ring made of urethane.

A plurality of magnets 344 may be provided on an inner bottom of the internal housing 304. The plurality of magnets 344 may be provided on an upper surface of a fixation member 346. The fixation member 346 may have a certain area, and an upper surface of the fixation member 346 may have a plane surface or a fluently curved surface. The fixation member 346 may be installed in a way that the upper surface of the fixation member 346 is opposite to the locking protrusion 322 of the ball 302. When the ball 302 is rotated, the magnet 324 of the ball 302 may be moved while being upwardly separated from the magnet 344 of the internal housing 304 with a certain distance. In the aforementioned configuration, the magnetic field may be generated between the magnet 324 of the ball 302 and the magnet 344 of the internal housing 304.

The external housing 306 may have a cylindrical shape. An inside diameter of the external housing 306 may be bigger than an outside diameter of the internal housing 304. The internal housing 304 may be placed in an inner space of the external housing 306. A switch 362 may be installed on an inner bottom of the external housing 306. The switch 362 may be turned on when a driver presses the ball 302, and the switch 362 may be turned off and generate an on/off signal when the driver releases pressing of the ball 302. When the driver presses the ball 302, the press force may press the switch 362 through the internal housing 304 and then the switch 363 may be turned on. When the driver release pressing of the ball 302, a force pressing the internal housing 304 may be disappeared and thus the switch 362 may be turned off.

An elastic member 364 may be installed between the internal housing 304 and the external housing 306, particularly, between a lower surface of the outside of the internal housing 304 and a bottom of the inside of the external housing 306. When the internal housing 304 is pressed, the elastic member 364 may be compressed, and when the compression of the internal housing 304 is released, the elastic member 364 may return to an original state. The elastic member 364 may be moved upward to an original position, which is a position before the internal housing 304 is pressed, by the restoration force of the elastic member 364, and then the contact between the internal housing 304 and the switch 362 may be released by raising of the internal housing 304, thereby turning off the switch 362.

A bearing 366 may be provided between the internal housing 304 and the external housing 306. Particularly the bearing 366 may be installed on an inner wall of the external housing 306. At least one bearing 366 may be installed, and alternatively, a plurality of bearings may be installed to be symmetrical. The bearing 366 may be configured to reduce the friction between an outside wall of the internal housing 304 and an inside wall of the external housing 306, wherein the friction may be generated when the internal housing 304 is compressed or the compression is released, thereby performing a reciprocating motion up and down. The bearing 366 may be a ball bearing. The bearing 366 may be replaced with lubricant. In addition, when the outside wall of the internal housing 304 and the inside wall of the external housing 306 are formed of material having low friction coefficient, the bearing 366 may be omitted.

Figure 4:
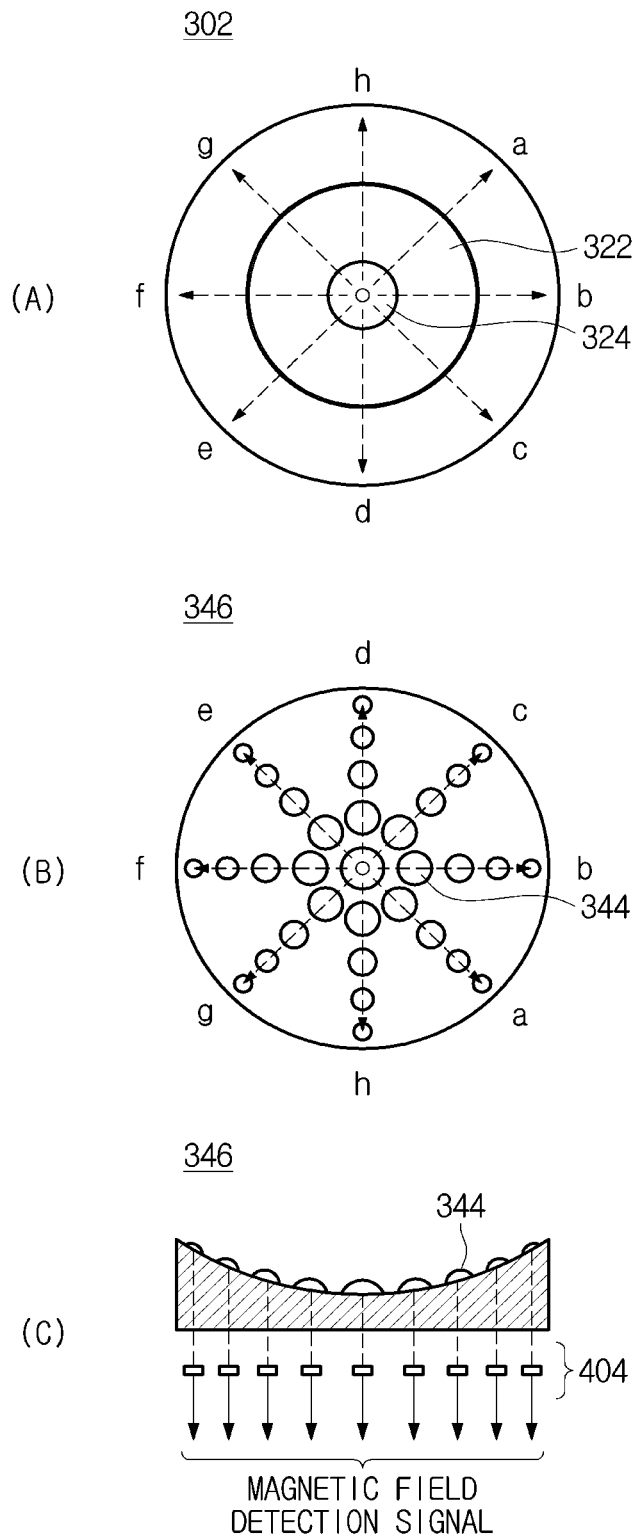
FIG. 4 is a view illustrating a structure of a ball and a magnet included in an input device of FIG. 3.

FIG. 4 is a view illustrating a structure of a ball and a magnet included in an input device of FIG. 3.

FIG. 4(A) is a view of the ball 302 when viewing from the magnet 344 of the internal housing 344. The magnet 324 may be provided on the center of the locking protrusion 322. The magnet 324 may be radially moved, as illustrated by an arrow, by the rotation of the ball 302. For convenience of the description, eight directions are illustrated in FIG. 4(A), but is not limited thereto. The ball 302 may have a higher degree of freedom and thus may be moved in various directions. The ball 302 may be moved in a curved manner as well as in a liner manner.

FIG. 4(B) is a plane view of the magnet 344 of the internal housing 304. That is, the 4(B) is a view of an upper surface of the magnet 344 when viewing from the ball 302. As mentioned above, the plurality of magnets 344 may be radially disposed on an upper surface of the fixation member 346. Each of the magnets 344 may have a circular shape. Among the plurality of magnets 344, the size of the magnet may be bigger as the magnet is close to the center (O), and the size of the magnet may be smaller as the magnet is far from the center (O). Accordingly, the magnetic field intensity of the magnet may be stronger as the magnet is close to the center (O), and the magnetic field intensity of the magnet may be weaker as the magnet is far from the center (O).

The reason of why the size (or the magnetic field intensity) of the plurality of magnets 344 are various according to the position of the magnet may be because the magnetic field intensity between the magnets 324 and 344 are to be different according to the rotation angle of the ball 302 when the magnet 324 of the ball 302 faces the plurality of magnets 344 of the fixation member 346. Accordingly, since the variation of the magnetic field intensity may represent the change of the position of the magnet 324 of the ball 302, the variation of relative position (rotation angle) of the magnet 324 of the ball 302 with respect to the plurality of magnets 344 of the fixation member 346 may be detected when the variation of the magnetic field is detected.

When in comparison with the magnet 344 of the internal housing 304, moving directions of the ball 302, which are from <a> to <h>, as illustrated in FIG. 4(A), may correspond to directions, which are from <a> to <h>, as illustrated in FIG. 4(B). When the magnet 324 of the ball 302 is moved in a direction <a> due to the rotation of the ball 302, a moving trajectory may be formed in a direction <a> on the magnet 344 of the internal housing 304. When the magnet 324 of the ball 302 is moved in a direction <g> due to the rotation of the ball 302, a moving trajectory may be formed in a direction <g> on the magnet 344 of the internal housing 304.

FIG. 4(C) is a lateral cross-sectional view of the magnet 344 of the internal housing 304. The plurality of magnets 344 may be attached (or embedded) to be protruded slightly from an upper surface of the fixation member 346. When the ball 302 is rotated, a trajectory in which the magnet 324 of the ball 302 is moved may have a curved surface and thus a surface formed by the plurality of magnets 344, which are disposed on the upper surface of the fixation member 346 of the internal housing 304, may have a curved shape.

Each of the magnets 344 of the internal housing 304 may be connected to at least one hall sensor 404. The hall sensor 404 may detect the variation of the magnetic field intensity generated in the plurality of the magnets 344 and then may generate a magnetic field detection signal. When the position of the magnet 324 of the ball 302 is changed due to the rotation of the ball 302, the magnetic field intensity detected by the hall sensor 404 may be changed according to the changed position. Accordingly, based on the variation of the magnetic field intensity, the relative position of the magnet 324 of the ball 302 against the plurality of the magnets 344 of the fixation member 346, that is the rotation angle of the ball 302, may be determined.

The hall sensor 404 may detect the magnetic field intensity by using the Hall effect, and then convert the magnetic field intensity to a voltage. The Hall effect is that an electric field is generated in a perpendicular direction to both of the magnetic field and the current when the current flows in a perpendicular direction to the magnetic field in a conductor in the magnetic field. The Hall effect is related to electrodes moved in a wire and a solid where the current flows. The magnetic field perpendicular to the wire where the current flows may allow the electrodes moved in the wire to be curved toward one surface. Therefore, negative electrodes are stacked on a surface of the wire, the surface of the wire is charged as a negative and, the other surface of the wire may be charged as a positive.

Accordingly, the electric field may present to be across the wire, and this is defined as the Hall effect, and the hall electric field may be estimated by measuring a voltage difference (Hall voltage) across the wire. In addition, since an electrode drifty velocity is vD=E/B, by using the Hall effect, a drifty velocity of the moved electrode may be measured and whether of a negative or a positive may be determined.

Figure 5:
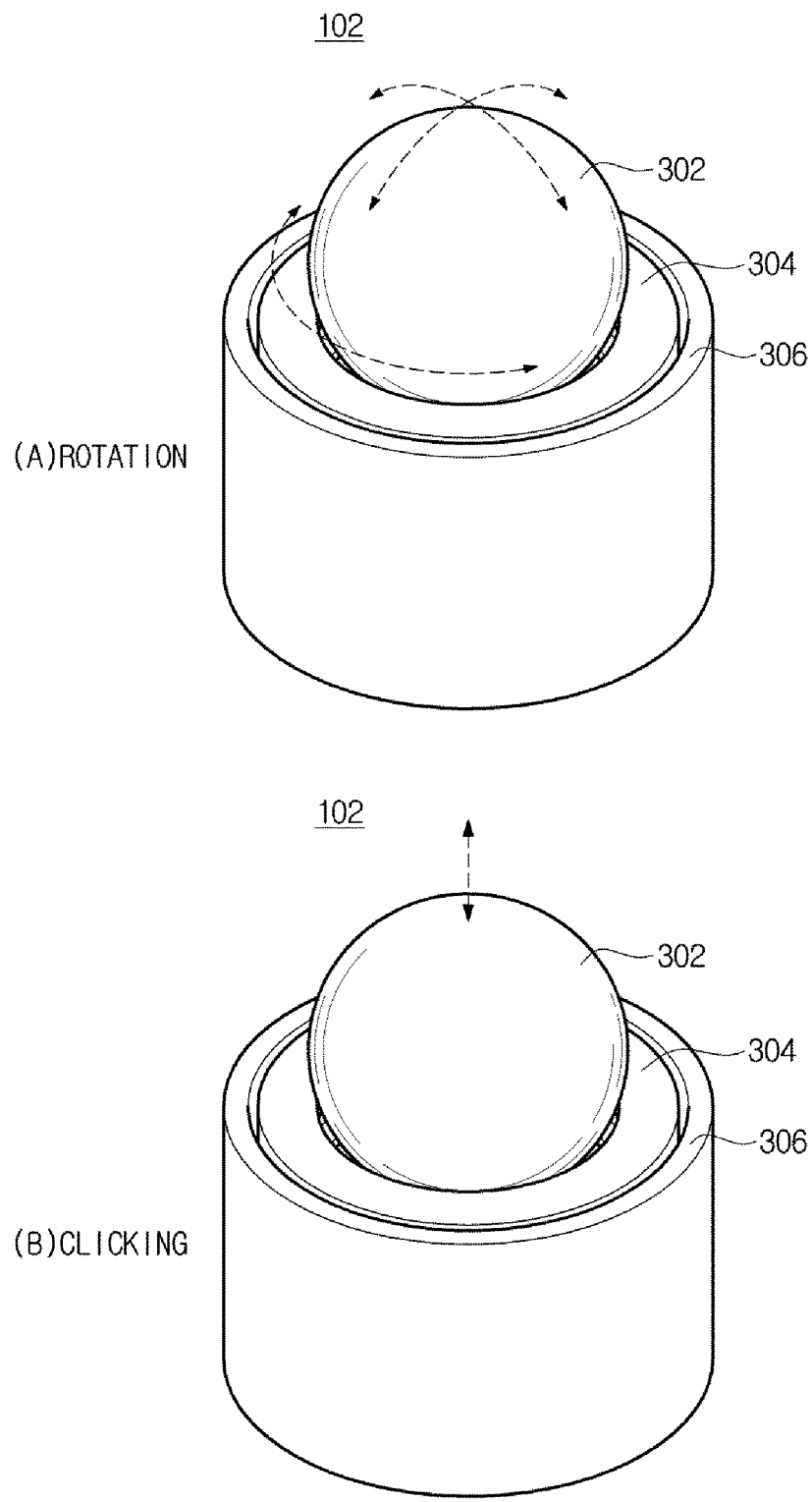
FIG. 5 is a view illustrating an operation of an input device in accordance with a first embodiment of the present disclosure.

FIG. 5 is a view illustrating an operation of an input device in accordance with a first embodiment of the present disclosure.

As illustrated in FIG. 5(A), the rotation of the ball 302 may represent an operation in which a driver may rotate the ball 302 in various angles. The rotation of the ball 302 may include rotating the ball 302 in four directions of up, down, left and right (including angles between directions), and rotating on an upper portion edge and a concentric circle of the internal housing 304.

As illustrated in FIG. 5(B), clicking the ball 302 may represent an operation in which a driver may compress the ball 302 downwardly and then release the compression. The ball 302 may be moved downwardly and then return to an original position by the click.

Figure 6:
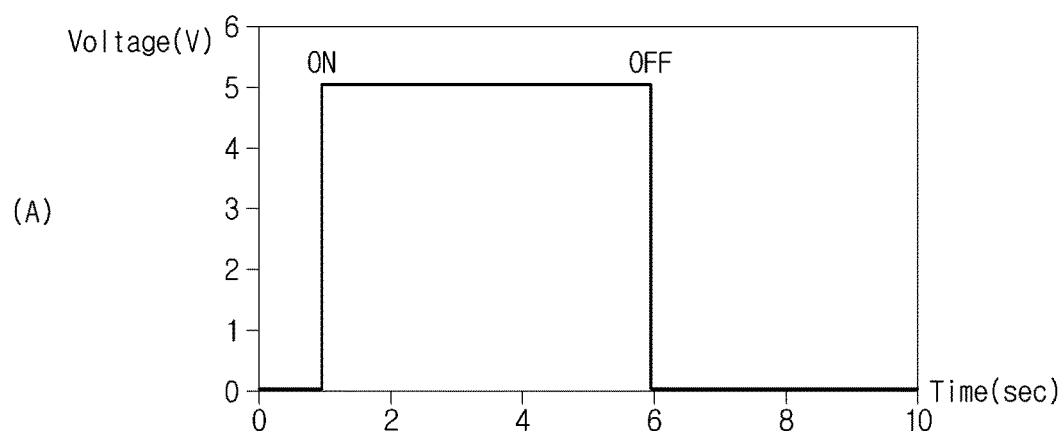
FIG. 6 is a view illustrating an input signal of an input device in accordance with a first embodiment of the present disclosure.
Figure 6:
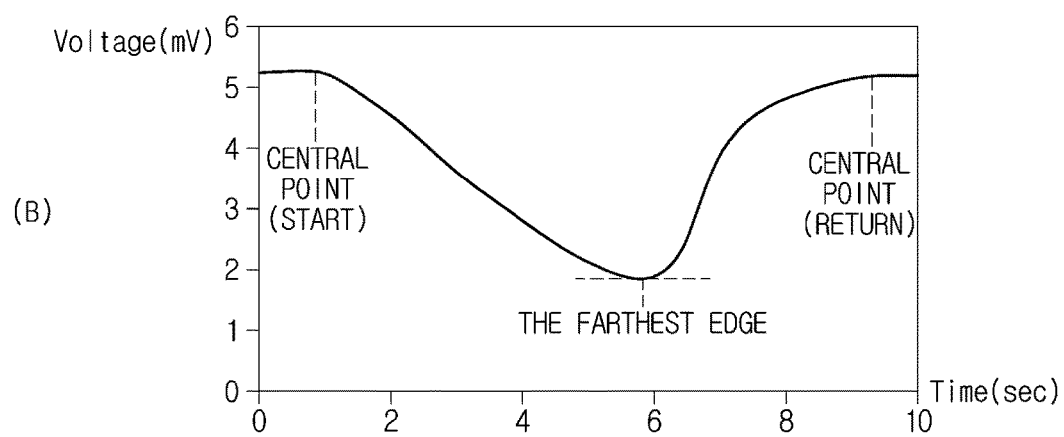

FIG. 6 is a view illustrating an input signal of an input device in accordance with a first embodiment of the present disclosure.

FIG. 6(A) is a graph illustrating an electronic signal generated by the click of the ball 302 of the input device 102 in accordance with a first embodiment of the present. When a driver presses the ball 302 and then releases the ball 302, which is compressing the ball 302 and then releasing the compression, the switch 362 may be turned on and then turned off. When the switch 362 is turned on, a voltage level of an input signal generated in the switch 362 may be increased, and when the switch 362 is turned off, a voltage level of an input signal generated in the switch 362 may be decreased. That is, a square wave pulse signal, as illustrated in FIG. 6(A), may be generated as an input signal depending on on/off the switch 362. Through the generation of the square wave pulse signal, it may be recognized that an operation of clicking may be performed.

FIG. 6(B) is a graph illustrating an electronic signal generated by the rotation of the ball 302 of the input device 102 in accordance with a first embodiment of the present. When a driver rotates the ball 302, the variation of the magnetic field may occur according to the displacement of the magnet 324 of the ball 302, as illustrated FIGS. 3 and 4. The variation of the magnetic field may be detected by the hall sensor 404 and may be displayed as the variation of the voltage having the waveform, as illustrated in FIG. 6(B). For example, in FIG. 6(B), when the magnet 324 of the ball 302 faces the central point (O) of the magnet 344 of the internal housing 304 that is the magnet 324 of the ball 302 is placed in the origin, an approximately 5.3 mV of the highest level voltage may occur. When the magnet 324 of the ball 302 is moved and then placed in the farthest edge of the magnet 344 of the internal housing 304, an approximately 2 mV of the lowest level voltage may occur. When the magnet 324 of the ball 302 returns to the central point (O) of the magnet 344 of the internal housing 304, an approximately 5.3 mV of the highest level voltage may occur again.

In FIG. 6(B), there may be a difference between a speed when the magnet 324 of the ball 302 is moved from the central point (O) to the edge portion, which is between 1 second and 6 seconds, and a speed when the magnet 324 of the ball 302 returns to the central point (O) from the edge portion, which is between 6 seconds and 9 seconds. Among the plurality of magnets 344 provided on the fixation member 346 of the internal housing 304, the magnetic field intensity of the magnets placed in the central point (O) may be stronger than the magnetic field intensity of the magnets placed the edge portion. Therefore, the speed when the magnet 324 of the ball 302 is moved from the central point (O) to the edge portion, which is between 1 second and 6 seconds, may be faster than the speed when the magnet 324 of the ball 302 returns to the central point (O) from the edge portion, which is between 6 seconds and 9 seconds.

Figure 7:
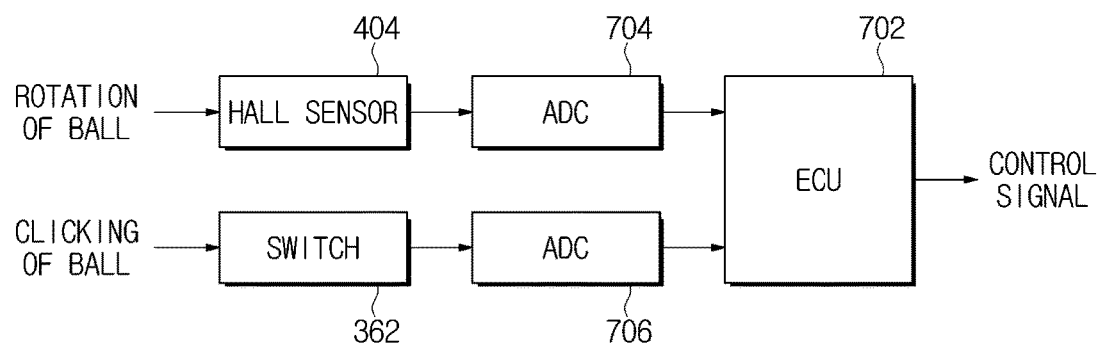
FIG. 7 is a control block diagram illustrating generating a control signal by receiving an input signal from an input device in accordance with a first embodiment.

In order that the magnet 324 of the ball 302 is moved from the central point (O) to the edge portion, an operation by a driver may be needed, but in order that the magnet 324 of the ball 302 returns to the central point (O) from the edge portion, which is between 6 seconds and 9 seconds, an operation by a driver may be not needed since the ball 302 may be rotated and return to the central point (O) by the interaction between two magnets 324 and 344, both of which have different polarity. from each other, FIG. 7 is a control block diagram illustrating generating a control signal by receiving an input signal from an input device in accordance with a first embodiment. An Electronic Control Unit (ECU) 702 may receive an input signal generated by an operation of the ball 302 of the input device 102 and then generate a control signal corresponding to the corresponding operation.

The input signal generated by the rotation of the ball 302 of the input device 102 may be converted to a digital signal by an analog-digital converter (ADC) 704, and then transmitted to the ECU 702. The ECU 702 may generate a control signal corresponding to the input signal with reference to a predetermined look-up table.

The input signal generated by the clicking of the ball 302 of the input device 102 may be converted to a digital signal by an analog-digital converter (ADC) 706, and then transmitted to the ECU 702. The ECU 702 may generate a control signal corresponding to the input signal with reference to a predetermined look-up table.

A control signal corresponding to each of the rotation and the clicking of the ball 302 or the combination of the rotation and the clicking may be subject to all components, which are operatable by a driver while driving. For example, the control signal may be configured to control a head up display displayed on a windshield of a vehicle, configured to control turning on/off a lamp of a vehicle, and configured to control multi-media devices of a vehicle. In addition the control signal may be configured to control a speed/brake/transmission/of a vehicle.

As mentioned above, the input device in accordance with embodiments of the present disclosure may significantly improve the extension of the menu in the user interface by each of the rotation and the clicking, and the combination of the rotation and the clicking. Particularly, a conventional input device displays that a certain function is allocated in each of a number of buttons/levers/dials by marking, but an input device in accordance with embodiments of the present disclosure may allow various menus to be operated by each of the rotation and the clicking or the combination of the rotation and the clicking. Particularly, when combined with a graphic user interface, the user interface may be limitlessly extended through simply updating firmware.

Figure 8:
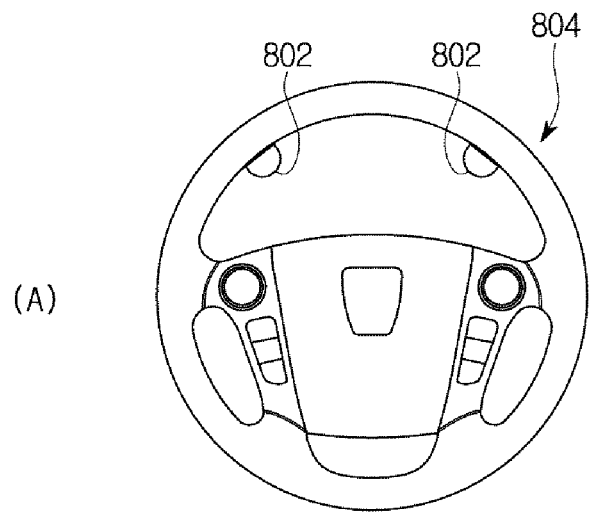
FIG. 8 is a view illustrating a steering wheel provided with an input device in accordance with a second and a third embodiment of the present disclosure.
Figure 8:
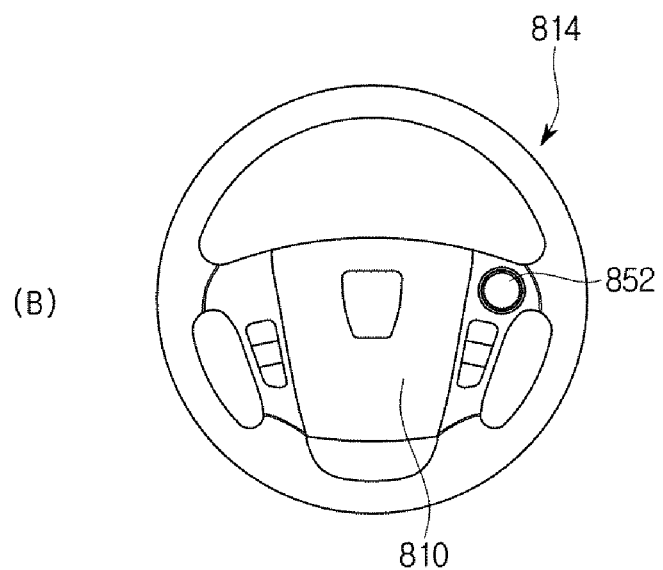

FIG. 8 is a view illustrating a steering wheel provided with an input device in accordance with a second and a third embodiment of the present disclosure.

FIG. 8(A) is a view of a steering wheel provided with an input device in accordance with a second embodiment of the present disclosure, particularly an input device 802 is installed on a rim 806 of a steering wheel 804. When a driver drives a high performance vehicle at a high speed, the driver may often hold between 2 o'clock direction and 10 o'clock direction of the steering wheel 804. When holding between 2 o'clock direction and 10 o'clock direction of the steering wheel 804, a quick operation may be performed. In the high performance vehicle, the input device 802 may be installed on a position of the rim 806, wherein the position is a place where both thumbs of the driver make contact each other when the driver holds between 2 o'clock direction and 10 o'clock direction of the steering wheel 804, as illustrated in FIG. 8(A) and thus the input device 802 may be easily operated at a high speed.

FIG. 8(B) is a view of a steering wheel provided with an input device 852 in accordance with a third embodiment of the present disclosure, particularly a single input device 852 is installed on a right side or a left side of a hub 810 of a steering wheel 814. In general, people dominantly use a right hand or a left hand, and thus a single input device 852 may be installed so that people may operate the input device 852 by using a dominant hand.

Figure 9:
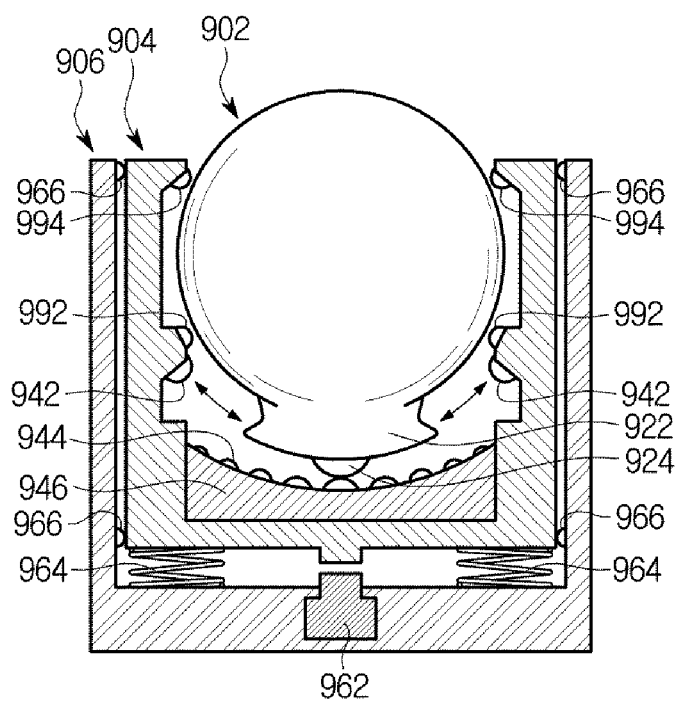
FIG. 9 is a view illustrating a structure of an input device in accordance with a fourth embodiment of the present disclosure.

FIG. 9 is a view illustrating a structure of an input device in accordance with a fourth embodiment of the present disclosure. FIG. 9 is a lateral cross-sectional view of the input device in accordance with a fourth embodiment. A ball 902 may basically have a spherical shape, and may further include a locking protrusion 922 formed in a protrusion manner. A part of the ball 902 may be placed in an internal housing 904, and the rest of the ball 902 may be exposed to the outside. A part where the locking protrusion 922 of the ball 902 is formed may be placed in the internal housing 904. The locking protrusion 922 may be formed with the ball 902 as a single molding. Alternatively, a sphere part and the locking protrusion 922 may be manufactured separately and then may be coupled to each other in a mechanical manner, such as assembly and adhesion.

The locking protrusion 922 may be configured to limit the rotation angle of the ball 902 so that the ball 902 is prevented from being rotated over a certain angle when the ball is rotated inside the internal housing 904. The shape and the size of the locking protrusion 922 may be formed to limit the rotation range of the ball 902. Accordingly, in a state in which the ball 902 is placed and rotated in the internal housing 904, when the rotation of the ball 902 reaches a certain rotation angle, the locking protrusion 922 may make contact with an inner surface of the internal housing 904 and further rotation of the ball 902 may be prevented so that the rotation angle of the ball 902 may be limited.

A magnet 924 may be provided on a surface of the locking protrusion 922 facing the internal housing 904. The magnet 924 may have a circular shape and may be protruded slightly from the surface of the locking protrusion 922. Alternatively, the magnet 924 may formed in polygonal shapes besides a circular shape. The magnet 924 of the ball 902 may have a polarity, which is opposite to a magnet 944 of the internal housing 904 described later, that is the magnet 924 and the magnet 944 are incompatible. The magnet 924 of the ball 902 may be defined as a first magnet and the magnet 944 of the internal housing 904 may be defined as a second magnet. The magnet 924 may be permanent magnet. The magnet 924 may be magnetic monopole.

The internal housing 904 may have a cylindrical shape. A part of the ball 902, which is a part of a side where the locking protrusion 922 is formed, may be placed in an upper portion of the internal housing 904. In an inner side of an upper edge of the internal housing 904, a shock absorption member 942 may be provided. When the ball 902 is rotated, the locking protrusion 922 may collide with the inner side of an upper edge of the internal housing 904 and a noise may be generated. Therefore, the shock absorption member 942 may absorb an impact, the generation of the noise may be restrained, and the damage in the ball 902 and the internal housing 904 may be prevented. The shock absorption member 942 may be an O-ring made of rubber. Alternatively, the shock absorption member 942 may be an O-ring made of urethane.

The internal housing 904 may be expanded to be long so that an upper portion of the ball 902 as well as a lower portion of the ball 902 may be placed in the internal housing 904. That is, when the ball 902 is placed in the internal housing 904, a majority of the ball 902 may be placed inside the internal housing 904 and a part of an upper portion of the ball 902 may be exposed to the outside. The internal housing 904 may support the ball 902 from a lower portion of the ball 902 and an upper portion of the ball 902. That is, two point of an inner wall of the internal housing 904 may be protruded to support the lower and upper portion of the ball 902. The supporting force may prevent the ball 902 from escaping toward the outside of the internal housing 904. Bearings 992 and 994 may be provided on a protrusion part making contact with the ball 902 of the internal housing 904. The bearings 992 and 994 may be configured to reduce the friction between a surface of the ball 902 and the internal housing 904. The bearings 992 and 994 may be a ball bearing. The bearings 992 and 994 may be replaced with lubricant. In addition, when the surface of the ball 902 and an outer wall of the internal housing 904 are formed of material having low friction coefficient, the bearings 992 and 994 may be omitted.

A plurality of magnets 944 may be provided on an inner bottom of the internal housing 904. The plurality of magnets 944 may be provided on an upper surface of a fixation member 946. The fixation member 946 may have a certain area, and an upper surface of the fixation member 946 may have a plane surface or a fluently curved surface. The fixation member 946 may be installed in a way that the upper surface of the fixation member 946 is opposite to the locking protrusion 922 of the ball 902. When the ball 902 is rotated, the magnet 924 of the ball 902 may be moved while being upwardly separated from the magnet 944 of the internal housing 904 with a certain distance. In the aforementioned configuration, the magnetic field may be generated between the magnet 924 of the ball 902 and the magnet 944 of the internal housing 904.

An external housing 906 may have a cylindrical shape. An inside diameter of the external housing 906 may be bigger than an outside diameter of the internal housing 904. The internal housing 904 may be placed in an inner space of the external housing 906. A switch 962 may be installed on an inner bottom of the external housing 906. The switch 962 may be turned on when a driver presses the ball 902, and the switch 962 may be turned off and generate an on/off signal when the driver releases pressing of the ball 902. When the driver presses the ball 902, the press force may press the switch 962 through the internal housing 904 and then the switch 962 may be turned on. When the driver release the compression of the ball 902, a force pressing the internal housing 904 may be disappeared and thus the switch 962 may be turned off.

An elastic member 964 may be installed between the internal housing 904 and the external housing 906, particularly, between a lower surface of the outside of the internal housing 904 and a bottom of the inside of the external housing 906. When the internal housing 904 is pressed, the elastic member 964 may be compressed, and when the compression of the internal housing 904 is released, the elastic member 964 may return to an original state. The elastic member 964 may be moved upwardly to an original position, which is a position before the internal housing 904 is pressed, by the restoration force of the elastic member 964, and then the contact between the internal housing 904 and the switch 962 may be released by raising of the internal housing 904, thereby turning off the switch 962.

A bearing 966 may be provided between the internal housing 904 and the external housing 906. Particularly the bearing 966 may be installed on an inner wall of the external housing 906. At least one bearing 966 may be installed, and alternatively, a plurality of bearings may be installed to be symmetrical. The bearing 966 may be configured to reduce the friction between an outside wall of the internal housing 904 and an inside wall of the external housing 906, wherein the friction may be generated when the internal housing 904 is compressed or the compression is released, thereby performing a reciprocating motion up and down. The bearing 966 may be a ball bearing. The bearing 966 may be replaced with lubricant. In addition, when the outside wall of the internal housing 904 and the inside wall of the external housing 906 are formed of material having low friction coefficient, the bearing 966 may be omitted.

Figure 10:
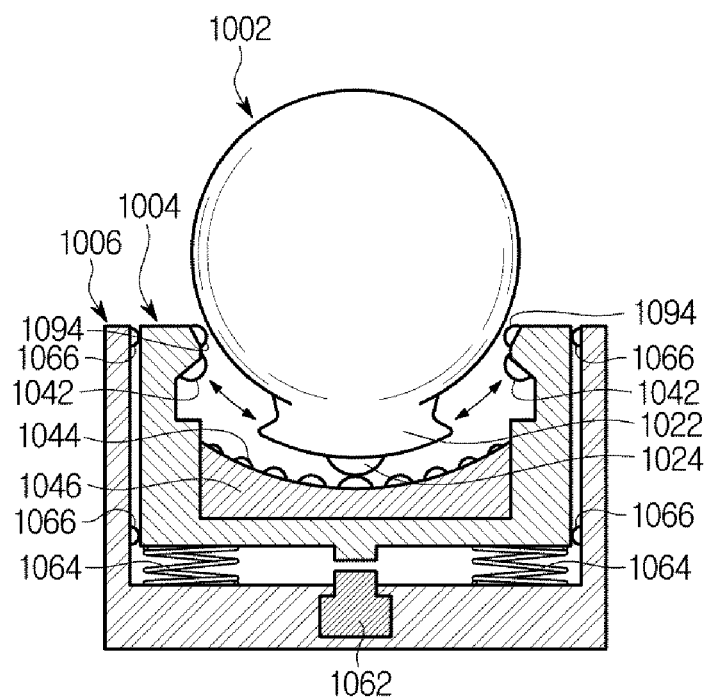
FIG. 10 is a view illustrating a structure of an input device in accordance with a fifth embodiment of the present disclosure.

FIG. 10 is a view illustrating a structure of an input device in accordance with a fifth embodiment of the present disclosure. FIG. 10 is a lateral cross-sectional view of the input device in accordance with a fifth embodiment. A ball 1002 may basically have a spherical shape, and may further include a locking protrusion 1022 formed in a protrusion manner. A part of the ball 1002 may be placed in an internal housing 1004, and the rest of the ball 1002 may be exposed to the outside. A part where the locking protrusion 1022 of the ball 1002 is formed may be placed in the internal housing 1004. The locking protrusion 1022 may be integrally formed with the ball 1002 as a single molding. Alternatively, a sphere part and the locking protrusion 1022 may be manufactured separately and then may be coupled to each other in a mechanical manner, such as assembly and adhesion.

The locking protrusion 1022 may be configured to limit the rotation angle of the ball 1002 so that the ball 1002 is prevented from being rotated over a certain angle when the ball is rotated inside the internal housing 1004. The shape and the size of the locking protrusion 1022 may be formed to limit the rotation range of the ball 1002. Accordingly, in a state in which the ball 1002 is placed and rotated in the internal housing 1004, when the rotation of the ball 1002 reaches a certain rotation angle, the locking protrusion 1022 may make contact with an inner surface of the internal housing 1004, and further rotation of the ball 1002 may be prevented so that the rotation angle of the ball 1002 may be limited.

A magnet 1024 may be provided on a surface of the locking protrusion 1022 facing the internal housing 1004. The magnet 1024 may have a circular shape and may be protruded slightly from the surface of the locking protrusion 1022. Alternatively, the magnet 1024 may formed in polygonal shapes besides a circular shape. The magnet 1024 of the ball 1002 may have a polarity, which is opposite to a magnet 1044 of the internal housing 1004 described later, that is the magnet 1024 and the magnet 1044 are incompatible. The magnet 1024 of the ball 1002 may be defined as a first magnet and the magnet 1044 of the internal housing 1004 may be defined as a second magnet. The magnet 1024 may be permanent magnet. The magnet 1024 may be magnetic monopole.

The internal housing 1004 may have a cylindrical shape. A part of the ball 1002, which is a part of a side where the locking protrusion 1022 is formed, may be placed in an upper portion of the internal housing 1004. In an inner side of an upper edge of the internal housing 1004, a shock absorption member 1042 may be provided. When the ball 1002 is rotated, the locking protrusion 1022 may collide with the inner side of an upper edge of the internal housing 1004 and a noise may be generated. Therefore, the shock absorption member 1042 may absorb an impact, the generation of the noise may be restrained, and the damage in the ball 1002 and the internal housing 1004 may be prevented. The shock absorption member 1042 may be an O-ring made of rubber. Alternatively, the shock absorption member 1042 may be an O-ring made of urethane.

A bearing 1094 may be provided on a surface of an upper edge of the internal housing 1004, wherein the surface makes contact with the ball 1002. The bearing 1094 may be configured to reduce the friction between a surface of the ball 1002 and the internal housing 1004. The bearing 1094 may be a ball bearing. The bearing 1094 may be replaced with lubricant. In addition, when the surface of the ball 1002 and an outer wall of the internal housing 1004 are formed of material having low friction coefficient, the bearing 1094 may be omitted.

A plurality of magnets 1044 may be provided on an inner bottom of the internal housing 1004. The plurality of magnets 1044 may be provided on an upper surface of a fixation member 1046. The fixation member 1046 may have a certain area, and an upper surface of the fixation member 1046 may have a plane surface or a fluently curved surface. The fixation member 1046 may be installed in a way that the upper surface of the fixation member 1046 is opposite to the locking protrusion 1022 of the ball 1002. When the ball 1002 is rotated, the magnet 1024 of the ball 1002 may be moved while being upwardly separated from the magnet 1044 of the internal housing 1004 with a certain distance. In the aforementioned configuration, the magnetic field may be generated between the magnet 1024 of the ball 1002 and the magnet 1044 of the internal housing 1004.

An external housing 1006 may have a cylindrical shape. An inside diameter of the external housing 1006 may be bigger than an outside diameter of the internal housing 1004. The internal housing 1004 may be placed in an inner space of the external housing 1006. A switch 1062 may be installed on an inner bottom of the external housing 1006. The switch 1062 may be turned on when a driver presses the ball 1002, and the switch 1062 may be turned off and generate an on/off signal when the driver releases the compression of the ball 1002. When the driver presses the ball 1002, the press force may press the switch 1062 through the internal housing 1004 and then the switch 1062 may be turned on. When the driver release the compression of the ball 1002, a force pressing the internal housing 1004 may be disappeared and thus the switch 1062 may be turned off.

An elastic member 1064 may be installed between the internal housing 1004 and the external housing 1006, particularly, between a lower surface of the outside of the internal housing 1004 and a bottom of the inside of the external housing 1006. When the internal housing 1004 is pressed, the elastic member 1064 may be compressed, and when the compression of the internal housing 1004 is released, the elastic member 1064 may return to an original state. The elastic member 1064 may be moved upwardly to an original position, which is a position before the internal housing 1004 is pressed, by the restoration force of the elastic member 1064, and then the contact between the internal housing 1004 and the switch 1062 may be released by raising of the internal housing 1004, thereby turning off the switch 1062.

A bearing 1066 may be provided between the internal housing 1004 and the external housing 1006. Particularly the bearing 1066 may be installed on an inner wall of the external housing 1006. At least one bearing 1066 may be installed, and alternatively, a plurality of bearings may be installed to be symmetrical. The bearing 1066 may be configured to reduce the friction between an outside wall of the internal housing 1004 and an inside wall of the external housing 1006, wherein the friction may be generated when the internal housing 1004 is compressed or the compression is released, thereby performing a reciprocating motion up and down. The bearing 1066 may be a ball bearing. The bearing 1066 may be replaced with lubricant. In addition, when the outside wall of the internal housing 1004 and the inside wall of the external housing 1006 are formed of material having low friction coefficient, the bearing 1066 may be omitted.

As is apparent from the above description, the input device as an improved user interface capable of allowing for a wider extension of user interface functionality, concentration of input devices, and enhancing driving convenience may be provided.

Although a few embodiments of the present disclosure have been shown and described, it would be appreciated by those skilled in the art that changes may be made in these embodiments without departing from the principles and spirit of the disclosure, the scope of which is defined in the claims and their equivalents.

DESCRIPTION OF REFERENCE NUMERALS 102, 802, 852: Input device
104: Steering wheel
150: Graphical user interface, Head Up Display (HUD)
302, 902, 1002: Ball
304, 904, 1004: Internal housing
306, 906, 1006: External housing
324, 344, 944, 1044: Magnet
362, 962, 1062: Switch
364, 964, 1064: Elastic member
366, 992, 994, 1094: Bearing
404: Hall sensor

What is claimed is:

1. A vehicle comprising:
an input device; and
a controller configured to receive a signal from the input device and generate a predetermined control signal corresponding to the received signal,
wherein the input device includes:
a rotation member provided with a first magnet disposed on a portion thereof;
a fixation member provided with a plurality of second magnets, which have a different magnetic field intensity from each other according to a distribution position of the plurality of second magnets, disposed on a surface thereof; and
a detection member generating a signal including information related to a relative position of the rotation member against the fixation member based on a variation of a magnetic field intensity, which is generated between the first magnet and the plurality of second magnets due to a position change of the first magnet when the rotation member is rotated.

2. The vehicle of claim 1, wherein
the plurality of second magnets is radially disposed on the surface of the fixation member.

3. The vehicle of claim 2, wherein
among the plurality of second magnets, the magnetic field intensity of a magnet disposed in a center of the plurality of second magnets is stronger than the magnetic field intensity of a magnet disposed apart from the center.

4. The vehicle of claim 1, wherein
the rotation member is a ball having a spherical shape.

5. The vehicle of claim 4, wherein
a portion of the rotation member protrudes to limit a rotation range of the rotation member, and
the first magnet is disposed on the protrusion part of the rotation member.

6. The vehicle of claim 1, wherein
the first magnet and the plurality of second magnets have an opposite polarity to each other.

7. The vehicle of claim 1, further comprising:
a first housing in which a portion of the rotation member is placed and the fixation member is fixedly installed;
a switch configured to generate a second signal indicating an on-state or an off-state by being turned on/off by compression of the rotation member and release of the compression of the rotation member; and
a second housing accommodating the first housing and provided with the switch which is installed in a position where a compression force of the rotation member is delivered to the switch through the first housing.

8. The vehicle of claim 7, wherein
the first housing and the second housing have a cylindrical shape.

9. The vehicle of claim 7, wherein
a bearing is provided between the first housing and the second housing to allow the first housing to be smoothly moved in the second housing.

10. The vehicle of claim 7, wherein
a shock absorption member is provided between the rotation member and the first housing to absorb an impact generated when the rotation member collides with the first housing.

11. The vehicle of claim 7, wherein
an elastic member is provided between the first housing and the second housing.

12. An input device comprising:
a rotation member provided with a first magnet disposed on a portion thereof;
a fixation member provided with a plurality of second magnets, which have a different magnetic field intensity from each other according to a distribution position of the plurality of second magnets, disposed on a surface thereof; and
a detection member generating a signal including information related to a relative position of the rotation member against the fixation member based on a variation of a magnetic field intensity, which is generated between the first magnet and the plurality of second magnets due to a position change of the first magnet when the rotation member is rotated.

13. The input device of claim 12, wherein
the plurality of second magnets is radially disposed on the surface of the fixation member.

14. The input device claim of 13, wherein
among the plurality of second magnets, the magnetic field intensity of a magnet disposed in a center of the plurality of second magnets is stronger than the magnetic field intensity of a magnet disposed apart from the center.

15. The input device claim of 12, wherein
the rotation member is a ball having a spherical shape.

16. The input device claim of 15, wherein
a portion of the rotation member protrudes to limit a rotation range of the rotation member, and
the first magnet is disposed on the protrusion part of the rotation member.

17. The input device claim of 12, wherein
the first magnet and the plurality of second magnets have an opposite polarity to each other.

18. A vehicle comprising:
an input device provided on a steering wheel system of the vehicle; and
a controller configured to receive a signal from the input device and generate a predetermined control signal corresponding to the received signal,
wherein the input device includes:
a rotation member provided with a first magnet disposed on a portion thereof;
a fixation member provided with a plurality of second magnets, which have a different magnetic field intensity from each other according to a distribution position of the plurality of second magnets, disposed on a surface thereof; and a detection member generating a signal including information related to a relative position of the rotation member against the fixation member based on a variation of a magnetic field intensity, which is generated between the first magnet and the plurality of second magnets due to a position change of the first magnet when the rotation member is rotated.

19. The vehicle claim 18, wherein
the steering wheel system includes a rim, a spoke, and a hub, and the input device is installed in the hub.

20. The vehicle claim 18, wherein
the steering wheel system includes a rim, a spoke, and a hub, and the input device is installed in the rim.

* * * * *